June 17, 1958  J. E. GUTRIDGE  2,839,012
HOLDING DEVICE FOR FREIGHT VEHICLE
Filed Sept. 16, 1953  2 Sheets-Sheet 1
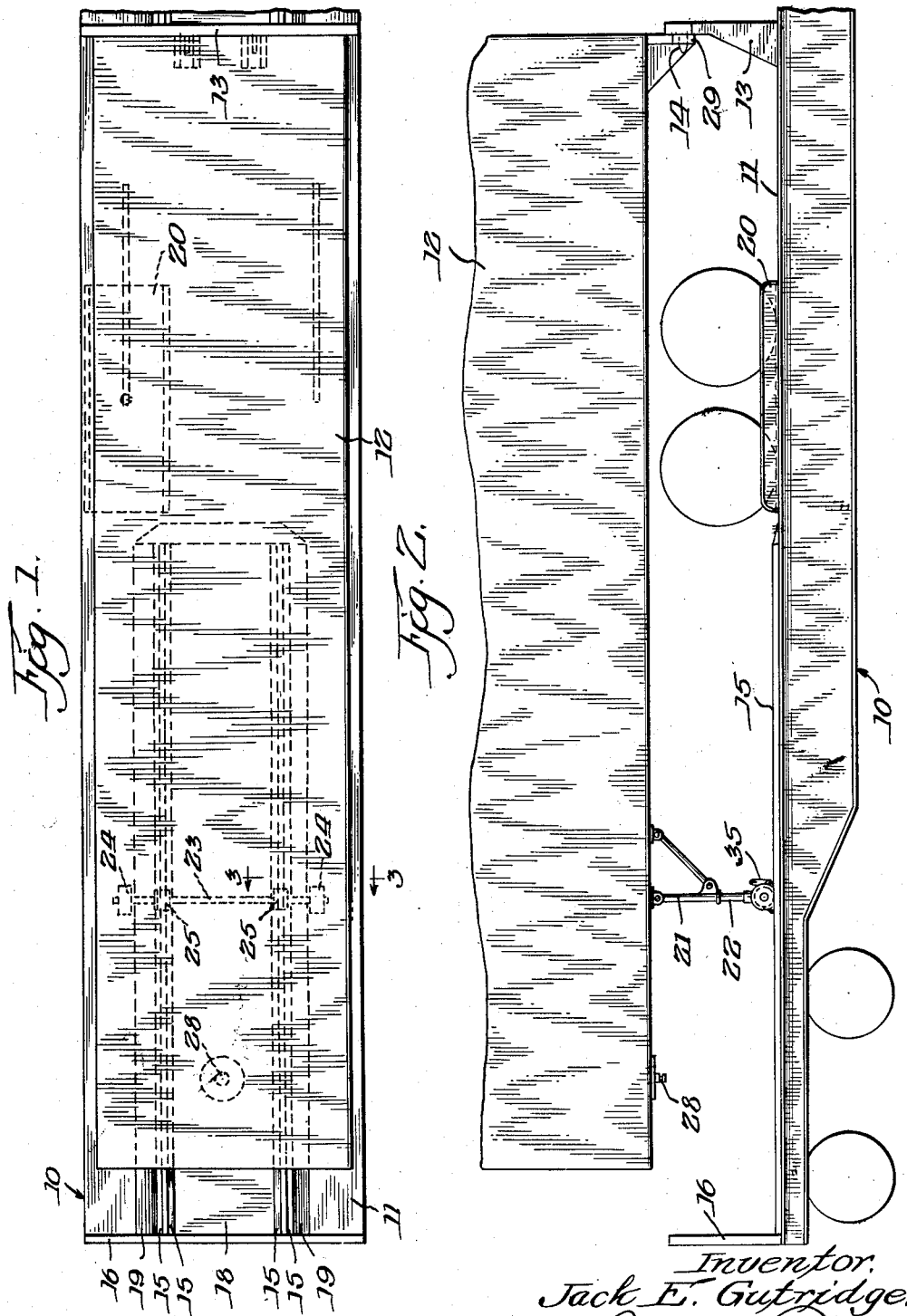
Inventor.
Jack E. Gutridge.
By Wayne Morris Russell
Atty.

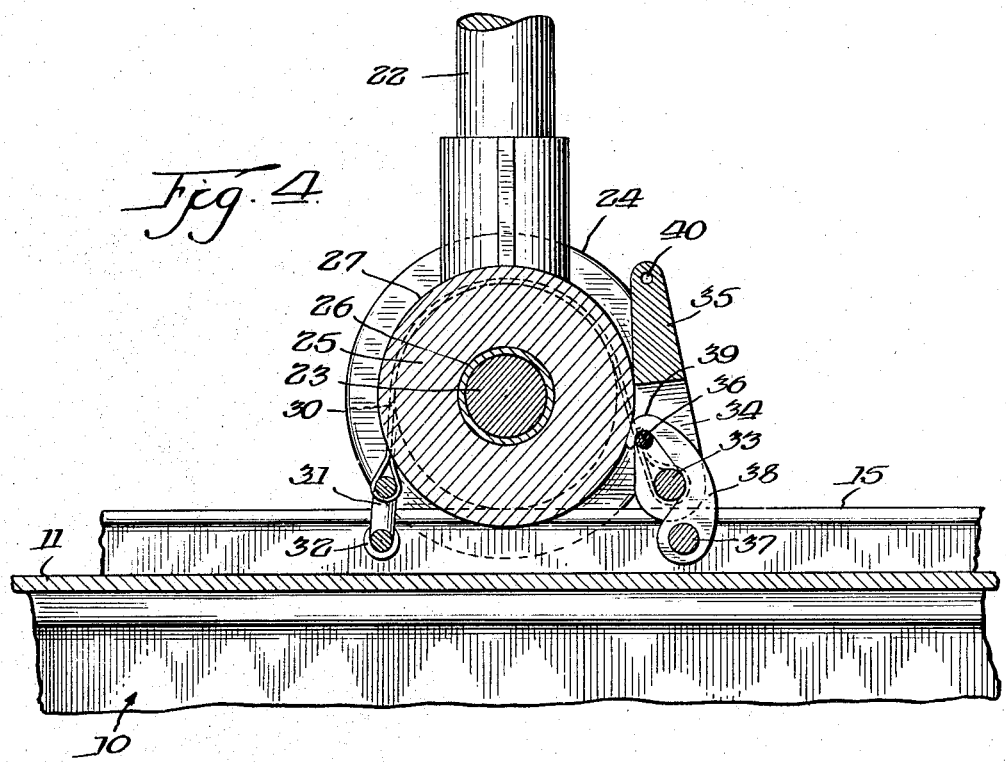
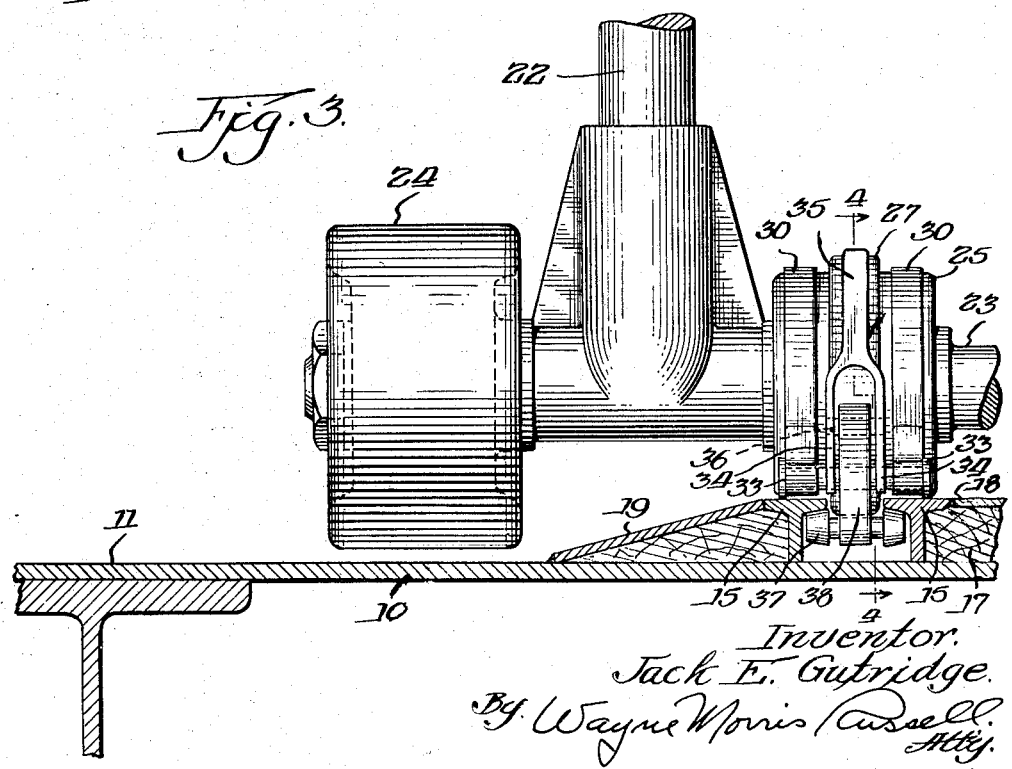

United States Patent Office 2,839,012
Patented June 17, 1958

2,839,012

HOLDING DEVICE FOR FREIGHT VEHICLE

Jack E. Gutridge, Munster, Ind., assignor to Pullman-Standard Car Manufacturing Company, Chicago, Ill., a corporation of Delaware Application September 16, 1953, Serial No. 380,547

2 Claims. (Cl. 105—368)

This invention relates to freight vehicles and is primarily concerned with apparatus for holding a vehicle on a railway freight car.

The principal object of the invention is to provide apparatus for holding a vehicle on a freight vehicle.

Another object of the invention is to provide apparatus for preventing vertical movement of a vehicle on a freight vehicle.

Another object of the invention is to provide apparatus for preventing sidewise movement of a vehicle on a freight vehicle.

A further object of the invention is to provide apparatus for spacing certain wheels of a vehicle from the floor of a freight vehicle while the vehicle is in transit.

A more specific object of the invention is to provide a releasable device for holding the dolly wheel structure of a truck trailer on the floor of a railway freight car.

A still more specific object of the invention is to provide a device for holding the dolly wheel axle of a truck trailer on the floor of a railway freight car including a strap embracing the axle and having one end anchored to the floor and a pin secured to the other end of the strap and a member pivotally connected to the pin and another pin carried by the member and a third pin engaging means on the floor and an element pivotally connected to the third pin and engaging the second named pin.

A further object of the invention is to provide on a dolly structure on the front end of a truck trailer wheels for supporting the front end of the trailer under certain conditions and rollers for supporting the front end of the trailer under certain other conditions.

The foregoing and other objects of the invention are attained by the construction and arrangement illustrated in the accompanying drawings wherein—

Fig. 1 is a top plan view of one-half of a railway flat car and showing a truck trailer loaded on the flat car;

Fig. 2 is a side elevational view of the portion of the railway flat car and the truck trailer shown in Fig. 1;

Fig. 3 is a cross sectional view taken on the line 3—3 of Fig. 1 and showing rollers on the trailer front axle supported upon rails on the floor of the flat car and hold down devices in locked position embracing the rollers and engaging the rails and wheels on the trailer front axle spaced from the floor of the flat car; and Fig. 4 is a cross sectional view taken on the line 4—4 of Fig. 3.

The invention proposes a device for holding a vehicle on a freight vehicle. A strap is adapted to embrace one axle on the vehicle and a part is secured to one end of the strap and engaged with means mounted on the floor of the freight vehicle on one side of the axle. An inverted Y-shaped member comprised of a pair of arms and a handle is engaged with the means on the floor of the freight vehicle on the other side of the axle and is moved toward the axle on the vehicle to draw the strap taut about the axle and movement of the handle away from the axle relieves the tension on the strap.

In the drawings, 10 generally designates a freight vehicle or railway flat car having the usual side sills and a floor 11 positioned on the side sills. A truck trailer 12 is adapted to be carried on the flat car 10 and is loaded on the flat car at a railroad terminal. The flat car 10 is parked alongside a platform at the terminal and the floor 11 of the car is disposed flush with the platform. The trailers 12 are hauled to the railroad terminal by truck tractors and are disconnected from the truck tractors and parked on the platform ready to be loaded on the flat car. The trailers 12 after being disconnected from the truck tractors are supported at their front ends on the platform by a retractible dolly wheel structure. A vertically disposed support 13 is positioned on the flat car 10 and extends across the width of the car and is fixedly secured to the floor 11. The support 13 has a pair of spaced horizontally disposed projections 14 thereon. A pair of spaced T-shaped rails 15 are positioned longitudinally of the flat car on the floor 11 and are secured to the floor and extend from the end wall 16 longitudinally of the car and terminate short of the center of the car. Another pair of spaced T-shaped rails 15 are positioned longitudinally of the flat car 10 on the floor 11 and are secured to the floor and are spaced from the first named pair of rails 15 and extend from the end wall 16 and terminate at the same relative location short of the center of the car. A wood filler 17 is positioned between the two pairs of rails 15 and a metal plate 18 is positioned upon the filler and is secured to the flanges of the innermost rails. A metal ramp plate 19 extends from the floor 11 to the flange of the outer rail of one pair of rails 15 and is welded to the flange and another metal ramp plate extends from the floor to the flange of the outer rail of the other pair of rails 15 and is welded to the flange. A wood filler is disposed between each ramp plate 19 and the floor 11 of the car. A channel-shaped turntable 20 is positioned between the pairs of rails 15 and the support 13 adjacent one side of the flat car 10 and is pivotally mounted at its center to the floor 11 of the car.

The trailer 12 has eight rear wheels, that is, a first pair of wheels are disposed in front of a second pair of wheels at one side of the trailer and a third pair of wheels are disposed in front of a fourth pair of wheels at the other side of the trailer. The dolly wheel structure at the front end of the trailer 12 is comprised of a pair of vertically disposed spaced tubes 21 and a standard 22 is retractible into each tube. A horizontally disposed axle 23 is mounted on the lower ends of the standards 22 and dolly wheels 24 are rotatably mounted on the ends of the axle. A pair of spaced rollers 25 are rotatably mounted on the axle 23 between the wheels 24 and a bearing 26 is interposed between each roller and the axle. A collar 23a bears against the inner face of each roller 25 and is integral with the axle 23 and another collar 23b bears against the outer face of each roller and is integral with a bearing on the respective standard 22. Each collar 23a and its adjacent collar 23b together prevent movement of the respective roller 25 axially of the axle 23. Each roller 25 has an integral rib 27 extending therearound and located midway between opposite faces of the roller. The trailer 12 has a fifth wheel pin 28 projecting from its bottom between the dolly wheel structure and the front end of the trailer. A lift truck is used to load the trailer 12 on the flat car 10 and this lift truck is of a special type which is movable both longitudinally and transversely of itself. The procedure for loading the trailer 12 on the flat car 10 is as follows: Assuming that the trailer 12 and the lift truck are both parked on the platform at the railroad terminal the lift truck moves under the trailer and engages the fifth wheel pin 28 and lifts the front end of the trailer 12 so that the wheels 24 on the trailer are spaced above the platform. The lift truck then moves the rear end of the trailer 12 onto the flat car 10 and directs the rear wheels at one side of the trailer onto the turntable 20. The lift truck then moves the front end of the trailer 12 onto the flat car 10 with the rear wheels above mentioned pivoting with the turntable 20 and the rear wheels at the other side of the trailer rolling on the floor 11 of the flat car. The lift truck then backs the trailer 12 longitudinally of the flat car 10 until a horizontally disposed channel 29 fixedly mounted on the rear end of the trailer and having a pair of spaced openings receives the projections 14 on the support 13. The lift truck then lowers the front end of the trailer 12 until each roller 25 rests upon the adjacent pair of rails 15 and the rib 27 on the roller projects between the pair of rails as best shown in Fig. 3. When the rollers 25 on the dolly wheel structure rest upon the pairs of rails 15 the wheels 24 are spaced above the floor 11 of the flat car 10. The lift truck then backs off the flat car.

The trailer 12 must be held on the flat car 10 during the shipment of the trailer. The support 13 with its projections 14 engaging openings in the channel 29 on the rear end of the trailer 12 serves to hold the rear end of the trailer on the car. The front end of the trailer 12 is held onto the car 10 by two hold down devices respectively engaging the rollers 25 and since these hold down devices are identical only the one about which the section lines 3—3 are taken in Fig. 1 will be described. A pair of straps 30 are positioned on opposite sides of the rib 27 on the roller 25 and the straps are adapted to embrace the roller. An I-shaped part 31 is comprised of a pair of spaced parallel bars and a third bar is disposed perpendicular midway of the lengths of the parallel bars and extends between and is integral with the parallel bars. Adjacent ends of the straps 30 are directed around one of the parallel bars of the part 31 on opposite sides of the third bar and secured. The part 31 is adapted to be placed between the adjacent pair of rails 15 and then turned at right angles so that the other parallel bar of the part engages the adjacent flanges on the rails. The parallel bar of the part 31 which engages the adjacent flanges of the adjacent pair of rails 15 has enlarged sloping bearing portions 32 on its ends which are sloped to correspond with the slope of the flanges of the rails. The other ends of the straps 30 are secured around a pin 33 extending through and projecting from each arm 34 of an inverted Y-shaped member having an upwardly extending handle 35 integral with the arms and positioned between the straps 30 with the free ends of the arms thus pivotally connected to the pin 33. A pin 36 is positioned intermediate the ends of the arms 34 of the member and extends between and is secured to the arms. A pin 37 has raised sloping portions on its ends to correspond with the slope of the adjacent flanges of the adjacent pair of rails 15. An element 38 has one end pivotally connected to the pin 37 between the raised sloping portions of the pin and the element has a hook 39 on its other end. Assuming that the trailer 12 has just been loaded on the flat car 10 the part 31 is directed between the adjacent pair of rails 15 and then turned at right angles so that the lower parallel bar of the part engages the adjacent flanges on the rails. The straps 30 are then directed around the respective roller 25 on opposite sides of its rib 27. The pin 37 and element 38 are then placed between the pair of rails 15 and turned at right angles so that the raised sloping portions of the pin bear against the adjacent flanges on the rails. The hook 39 of element 38 is then engaged on the pin 36. The handle 35 of the member is then moved in a counterclockwise direction as viewed in Fig. 4 and movement of the handle in this direction causes the straps 30 to be drawn taut about the roller 25. Movement of the handle 35 in the counterclockwise direction as viewed in Fig. 4 is continued until it bears against the rib 27 on the roller 25.

Looking at Fig. 4 it will be seen that when the member is against the rib 27, a straight line through the centers of the pins 36 and 37 will pass on the left hand side of the center of the pin 33 which is thus beyond dead center so that no matter how great the tension in the straps 30, the member will remain in locked position. The handle 35 on the member may be provided with a hole 40 therein so that a length of cord may be threaded through the hole and the cord tied to the adjacent standard 22 if desired to assure that the member will remain in locked position while the trailer 12 is in transit.

To unload the trailer 12 from the flat car 10, the handle 35 is moved in a clockwise direction as viewed in Fig. 4 to relieve the tension on the straps 30 so that the hook 39 on element 38 may be removed from the pin 36 and the strap thus released. Then the handle member and the straps 30 may be swung over the roller 25 and thereby release the trailer. The lift truck then moves onto the flat car 10 and under the front end of the trailer 12 and engages the fifth wheel pin 28 and lifts the front end of the trailer so that the rollers 25 are spaced above the rails 15. The lift truck then moves the trailer 12 longitudinally forward on the flat car 10 so that the projections 14 on the support 13 are no longer engaged with the channel 29 on the rear end of the trailer. The lift truck then moves the front end of the trailer 12 off the flat car 10 onto the platform with the rear wheels at one side of the trailer pivoting with the turntable 20 while the other rear wheels at the other side roll on the floor 11 of the flat car. The lift truck then moves the trailer 12 off the flat car 10 and lowers the front end of the trailer 12 until the dolly wheels 24 bear upon the platform and then backs from under the trailer.

The rib 27 on each roller 25 is adapted to engage the adjacent flanges on the adjacent pair of rails 15 to prevent movement of the dolly wheel structure transversely of the flat car 10 and thus preventing movement of the front end of the trailer 12 transversely of the flat car. Each hold down device engages the adjacent flanges on the adjacent pair of rails 15 to prevent vertical movement of the dolly wheel structure and thus preventing vertical movement of the front end of the trailer 12.

The other half of the flat car 10, not shown in the drawings, has a support and projections on the end of the flat car similar to the support 13 and projections 14 and two pairs of rails similar to the rails 15 and a turntable similar to the turntable 20. A truck trailer is also carried on this half of the flat car 10 and hold down devices identical to that described are used on the dolly wheel structure of the trailer. Thus, it will be seen that the flat car 10 is adapted to carry two truck trailers.

From the foregoing it will be seen that there has been provided a hold down device engageable with the dolly wheel structure of a truck trailer to prevent vertical movement of the front end of the trailer while being transported on a railway flat car and the dolly wheel structure also being engageable with means on the floor of the flat car to prevent sidewise movement of the front end of the trailer while on the flat car.

What is claimed is:

1. In a freight vehicle adapted to carry a truck trailer including a dolly wheel structure having an axle and a roller on the axle, a floor, a pair of rails positioned on the floor and secured thereto, and a device to secure the dolly wheel structure to the rails comprising a strap adapted to embrace the roller and a part secured to one end of the strap and anchored to the rails and a first pin positioned between and anchored to the rails and a second pin secured to the other end of the strap and a member including a pair of arms and having the free ends of the arms pivotally connected to the second pin and a third pin extending between the arms of the member intermediate their ends and an element having one end pivotally connected to the first pin and having a hook on its other end engaging the third pin and rotation of the member toward the roller causing the strap to be drawn taut about the roller, a line through the centers of the first and third pins passing along the side of the center of the second pin adjacent the roller and the device being removable from the roller and rails by moving the member away from the roller and moving the hook off the third pin and turning the part and the third pin at right angles and lifting them upwardly.

2. In a freight vehicle adapted to carry a truck trailer including a dolly wheel structure having an axle and a pair of spaced rollers on the axle, a floor, two spaced pairs of spaced rails positioned on the floor and secured thereto and each pair of rails having flanges projecting toward each other, and a device anchored to each pair of rails and each device comprising a pair of straps adapted to embrace the roller and a part secured to one end of each strap and having a bar extending transversely of the adjacent pair of rails and disposed below and engaging the flanges on the pair of rails and a first pin positioned between the pair of rails transversely thereof and disposed below and engaging the flanges of the rails and a second pin secured to the other end of each strap and a Y-shaped member including two arms and a handle and having the free ends of the arms pivotally connected to the second pin and a third pin extending between the arms of the member intermediate their ends and an element having one end pivotally connected to the first pin and having a hook on its other end engaging the third pin and rotation of the member toward the roller causing the straps to be drawn taut about the roller and a line through the centers of the first and third pins passing along the side of the center of the second pin adjacent the roller and the device being removable from the roller and rails by moving the member away from the roller and moving the hook off the third pin and turning the part and the third pin at right angles and lifting them upwardly.

References Cited in the file of this patent

UNITED STATES PATENTS

| | | |
|---|---|---|
| 1,498,087 | Fowler | June 17, 1924 |
| 1,838,975 | Williams | Dec. 29, 1931 |
| 2,013,345 | Gellatly | Sept. 3, 1935 |
| 2,023,972 | Otis | Dec. 10, 1935 |
| 2,024,444 | Friedlaender | Dec. 17, 1935 |
| 2,036,344 | Menhall | Apr. 7, 1936 |
| 2,099,288 | Allen | Nov. 16, 1937 |
| 2,292,310 | Wilkins | Aug. 4, 1942 |
| 2,503,368 | Willetts | Apr. 11, 1950 |
| 2,525,388 | Willetts | Oct. 10, 1950 |
| 2,628,397 | Olson | Feb. 17, 1953 |

FOREIGN PATENTS

| | | |
|---|---|---|
| 388,168 | Great Britain | Feb. 23, 1933 |